(12) United States Patent
Takei

(10) Patent No.: US 7,126,640 B1
(45) Date of Patent: Oct. 24, 2006

(54) AUTOFOCUS STROBE CONTROL IN IMAGE SENSING APPARATUS

(75) Inventor: Hirofumi Takei, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 772 days.

(21) Appl. No.: 09/645,753

(22) Filed: Aug. 24, 2000

(30) Foreign Application Priority Data

Aug. 25, 1999 (JP) ............................. 11-238188
Aug. 14, 2000 (JP) ............................. 2000-246002

(51) Int. Cl.
H04N 5/222 (2006.01)

(52) U.S. Cl. ........................... 348/371; 348/345

(58) Field of Classification Search ............ 348/312, 348/345, 347, 349, 351, 353–356, 362, 363, 348/364, 370, 371; 396/155, 157, 162, 164, 396/166, 167, 106
See application file for complete search history.

(56) References Cited

U.S. PATENT DOCUMENTS

| | | | | |
|---|---|---|---|---|
| 4,771,307 A | * | 9/1988 | Kuno et al. .................. | 348/348 |
| 4,846,155 A | * | 7/1989 | Kimura ........................ | 348/351 |
| 5,097,340 A | * | 3/1992 | Tanabe et al. ............... | 348/371 |
| 5,229,856 A | * | 7/1993 | Koshiishi .................... | 348/312 |
| 5,438,367 A | * | 8/1995 | Yamamoto et al. .......... | 348/371 |
| 5,546,121 A | * | 8/1996 | Gotanda et al. ............. | 348/64 |
| 5,559,552 A | * | 9/1996 | Inuiya et al. ............. | 348/220.1 |
| 6,278,490 B1 | * | 8/2001 | Fukuda et al. .............. | 348/362 |
| 6,426,775 B1 | * | 7/2002 | Kurokawa .................. | 348/363 |
| 6,700,614 B1 | * | 3/2004 | Hata .......................... | 348/345 |
| 6,744,471 B1 | * | 6/2004 | Kakinuma et al. .......... | 348/371 |
| 6,753,919 B1 | * | 6/2004 | Daugman .................. | 348/345 |
| 6,876,392 B1 | * | 4/2005 | Uomori et al. ............. | 348/370 |
| 6,961,091 B1 | * | 11/2005 | Kubo ......................... | 348/370 |
| 7,071,987 B1 | * | 7/2006 | Tanaka ....................... | 348/362 |
| 2004/0109082 A1 | * | 6/2004 | Yokonuma .................. | 348/371 |
| 2005/0041143 A1 | * | 2/2005 | Kakiuchi et al. ........... | 348/370 |

FOREIGN PATENT DOCUMENTS

| | | |
|---|---|---|
| JP | 5-268505 | 10/1993 |
| JP | 6-90397 | 3/1994 |
| JP | 7-92371 | 4/1995 |
| JP | 7-99600 | 4/1995 |
| JP | 8-275050 | 10/1996 |
| JP | 9-312797 | 12/1997 |
| JP | 11-64723 | 3/1999 |
| JP | A11-069224 | 3/1999 |
| JP | 2000-111790 | 4/2000 |
| JP | 2000-253302 | 9/2000 |

* cited by examiner

Primary Examiner—Vivek Srivastava
Assistant Examiner—Jason Whipkey
(74) Attorney, Agent, or Firm—Morgan & Finnegan, LLP

(57) ABSTRACT

Provided is control relating to autofocusing in an image sensing apparatus having an image sensing unit for photo-electrically converting an optical image of a subject to obtain an image signal representing the subject, and an autofocus function, the apparatus being capable of performing photography using a fill-in light emission unit. Control includes setting a charge accumulation period of the image sensing unit, deciding light-emission time of the fill-in light emission unit based upon the charge accumulation period that has been set, performing control in such a manner that the fill-in light emission unit is caused to emit light for the decided light-emission time in sync with start of the charge accumulation period, and performing focusing control based upon the image signal obtained from the image sensing unit. Control of the fill-in light emission unit is executed repeatedly during control of focusing.

27 Claims, 14 Drawing Sheets

AUTOFOCUS STROBE CONTROL IN IMAGE SENSING APPARATUS

FIELD OF THE INVENTION

This invention relates to an image sensing apparatus capable of effectively using a fill-in light upon forming signals for focus control, a control method of an image sensing apparatus, and a medium for providing a control program for controlling an image sensing apparatus.

BACKGROUND OF THE INVENTION

A video camera is one example of an image sensing apparatus. In the field of video cameras, the recording not only of moving pictures but of still pictures as well has recently become a matter of much interest. A video camera on which a strobe light can be mounted in order to record a high-quality still picture on a recording medium has been proposed. Such a video camera provides a greater number of photographic opportunities.

Such strobe lights include one having a main-light emission unit and a fill-in light emission unit for actuating an autofocus function prior to photography. In a strobe light of this kind, focusing is achieved by lighting the fill-in light emission unit and actuating the autofocus function, after which the main-light emission unit is lit and the still picture stored on the storage medium.

The main technique used for implementing the autofocus function in an ordinary video camera is TVAF. According to the TVAF technique, autofocusing is performed by detecting the sharpness of an image using a video signal obtained as a result of photoelectrically converting the image of an optical subject by an image sensing device or the like, and controlling the position of a focusing lens so as to maximize the detected value.

In general, the degree of sharpness is evaluated using the level (referred to a "focus evaluation value" below) of the high-frequency components of a video signal that has been extracted by a bandpass filter having a certain pass band. Specifically, when an ordinary subject image is photographed, the focus evaluation value increases with focusing, as illustrated in the characteristic diagram of FIG. 2. Accordingly, the point at which the focus evaluation value peaks is taken as being the in-focus position.

Control of the autofocus function in a video camera that is capable of still photography and possesses a strobe light will be described on the basis of the flowchart shown in FIG. 12.

Step S901 is a preparatory step at which the fill-in light emission unit is lit and the autofocus function actuated. This is followed by step S902, at which the focusing lens is driven in very small increments and the focus evaluation value is detected. Next, on the basis of the focus evaluation value thus obtained at step S902, it is determined at step S903 whether the camera is presently in focus as a result of finely driving the focusing lens.

If it is determined that the camera is not in the focused state, control proceeds to step S904. Here, in accordance with the result of finely driving the focusing lens, it is determined in which direction the in-focus point is located (i.e., if the focusing lens should be moved toward the camera side or subject side from its present position to obtain the peak of the focus evaluation value). If the direction in which the in-focus point is located cannot be determined, control returns to step S902. If the direction in which the in-focus point is located can be determined, control proceeds to step S905, at which an operation for moving the focusing lens in the determined direction is executed. (This is referred to as a "hill-climbing operation" owing to the shape of the graph shown in FIG. 2.)

Next, at step S906, it is determined whether the position of the focusing lens has exceeded the in-focus point, i.e., whether it has exceeded the peak of the focus evaluation value. Control returns to step S905 if it is determined that the peak of the focus evaluation value has not been exceeded or proceeds to step S907 if it is determined that the peak of the focus evaluation value has been exceeded. Step S907 calls for the focusing lens to be moved back in the direction of peak of the focus evaluation value. It is then determined at step S908 whether the focus evaluation value has reached the peak. Control returns to step S907 if it is determined that the focus evaluation value has not reached the peak or to step S902 if it is determined that the focus evaluation value has reached the peak.

By executing the processing of steps S907 and S908, the focusing lens can be controlled so as to be moved to the position at which the focus evaluation value is maximized. However, since there are instances where the subject being photographed changes owing to panning or the like during the operation for returning the focusing lens to the position at which the focus evaluation value attains its peak, there are occasions where it cannot be ascertained whether this position is the true peak.

Accordingly, once the focus evaluation value has arrived at the peak, processing returns to that from step S902 onward and the operation for finely driving the focusing lens is performed again in order to confirm that the present focus evaluation value is the true peak, i.e., to confirm that the camera is in the focused state.

If it is determined at step S903 that the camera is in the focused state, control proceeds to a still-picture capture routine from step S909 onward.

Movement of the focusing lens is halted at step S909, the fill-in light emission unit is turned off at step S910 and the main-light emission unit is turned on at step S911 to increase the illumination of the subject, in which state the still picture is captured. This processing is then exited.

The example of the prior art described above has certain shortcomings.

Specifically, in view of problems relating to durability and power consumption of the fill-in light emission unit, keeping the fill-in light emission unit lit over the entire period of the focusing operation is undesirable. In actuality, therefore, the fill-in light emission unit is turned on and off.

However, an AF (autofocus) evaluation value which prevails when the fill-in light emission unit is on differs from that which prevails when the fill-in light emission unit is off. Therefore, autofocus control cannot be performed accurately if the fill-in light emission unit is turned on and off at a random timing.

Control of a fill-in light emission according to the prior art is synchronized to the vertical synchronizing signal of the video signal to turn on the fill-in light emission unit based upon the pulses of the vertical synchronizing signal, as proposed in the specification of Japanese Patent Application Laid-Open (KOKAI) No. 11-69224. FIG. 13 is a timing chart showing the timing at which the fill-in light emission unit is turned on and the charge accumulation timing of an image sensing device (CCD). As shown in FIG. 13, ON and OFF timings are synchronized to a vertical synchronizing signal and the duration of fill-in lighting is made a whole-number multiple of the vertical scanning interval (twice the vertical scanning interval in the example of FIG. 13). Fill-in light is emitted during this multiple of the vertical scanning interval. In the example depicted in FIG. 13, the fill-in light is turned off for one vertical scanning interval that follows the emission period. The focus evaluation values in respective ones of the three vertical scanning intervals are found, the values are averaged and the average value thus obtained is used as the focus evaluation value. If this is done, the average values of focus evaluation values obtained at the timings of focus-evaluation-value averaging intervals a, b and c will be the same. This makes it possible to perform stable autofocus control.

In the example of the prior art described above, the focus evaluation value of each vertical scanning interval can be obtained artificially by adding and averaging the focus evaluation values of a plurality (e.g., three) of successive vertical scanning intervals. However, the focus evaluation value thus obtained is a focus evaluation value of a past vertical scanning interval, i.e., a focus evaluation value which contains information that is old in terms of time. It is difficult to perform real-time autofocus control using this focus evaluation value.

Further, at least one of the plurality (e.g., three) of successive vertical scanning intervals is a vertical scanning interval in which the fill-in light is off. As a consequence, even if autofocus control is carried out every vertical scanning interval using a focus evaluation value obtained based solely upon a signal value acquired in each vertical scanning interval, a focus evaluation value obtained while the fill-in light is off will be unsuitable for use in autofocus control in a case where illumination of the subject is inadequate. This places a limitation upon control and results in a troublesome operation.

Further, the fill-in light emission unit is turned on at the same timing regardless of whether drive is performed at a high shutter speed in which the charge accumulation period of the image sensing device is, e.g., $\frac{1}{250}$ of a second or $\frac{1}{1000}$ of a second, or at an ordinary shutter speed in which the charge accumulation period of the image sensing device is $\frac{1}{60}$ of a second.

FIG. 14 is a diagram illustrating the charge accumulation timing of an ordinary image sensing device (CCD) driven at a high shutter speed of $\frac{1}{250}$ of a second, which shows CCD signal quantity and a vertical synchronizing signal.

As shown in FIG. 14, a signal that has accumulated over the first half of $\frac{1}{60}$ of a second, which is the drive cycle of one field, is dumped at a timing Ta. A signal that has accumulated over a period of $\frac{1}{250}$ of a second, which extends from Ta to Tb, is then read out as an image signal. Thus, in a case where drive is performed at a high shutter speed, turning on the fill-in light emission unit in a manner the same as that when drive is performed at the ordinary shutter speed of $\frac{1}{60}$ of a second means that the emission of light from the fill-in light emission unit up to Ta has no effect and is a wasteful light emission. Power is thus consumed needlessly.

SUMMARY OF THE INVENTION

The present invention has been devised in view of the problems set forth above and its object is to provide an image sensing apparatus capable of effectively using a fill-in light upon forming signals for focus control, a control method of an image sensing apparatus, and a medium for providing a control program for controlling an image sensing apparatus.

According to the present invention, the foregoing object is attained by providing an image sensing apparatus comprising: an image sensing device that senses an optical image of an object and converting the optical image into an image signal to be used for photographing; a signal forming device that forms a signal for focusing on the basis of the image signal obtained from the image sensing device; and a control device that emits light for assisting signal forming operation performed by the signal forming device and changes emitting the light in correspondence with an image sensing period of the image sensing device when the signal forming device forms the signal for focusing.

According to the present invention, the foregoing object is also attained by providing an image sensing apparatus comprising: an image sensing device that senses an optical image of an object and converting the optical image into an image signal to be used for photographing; a signal forming device that forms a signal for focusing on the basis of the image signal obtained from the image sensing device; and a control device that repeatedly emits light for assisting signal forming operation performed by the signal forming device at a period of image sensing operation of the image sensing device.

Furthermore, the foregoing object is also attained by providing a control method of an image sensing apparatus having: an image sensing device that senses an optical image of an object and converting the optical image into an image signal to be used for photographing; and a signal forming device that forms a signal for focusing on the basis of the image signal obtained from the image sensing device, the method comprising the steps of: emitting a light for assisting signal forming operation performed by the signal forming device; and changing emitting the light in correspondence with an image sensing period of the image sensing device when the signal forming device forms the signal for focusing.

Further, the foregoing object is also attained by providing a control method of an image sensing apparatus having: an image sensing device that senses an optical image of an object and converting the optical image into an image signal to be used for photographing; and a signal forming device that forms a signal for focusing on the basis of the image signal obtained from the image sensing device, the method comprising the step of: repeatedly emitting a light for assisting signal forming operation performed by the signal forming device at a period of image sensing operation of the image sensing device.

Further, the foregoing object is also attained by providing a medium for providing a control program of an image sensing apparatus having: an image sensing device that senses an optical image of an object and converting the optical image into an image signal to be used for photographing; and a signal forming device that forms a signal for focusing on the basis of the image signal obtained from the image sensing device, wherein the program emits a light for assisting signal forming operation performed by the signal forming device and changes emitting the light in correspondence with an image sensing period of the image sensing device when the signal forming device forms the signal for focusing.

Further, the foregoing object is also attained by providing a medium for providing a control program of an image sensing apparatus having: an image sensing device that senses an optical image of an object and converting the optical image into an image signal to be used for photographing; and a signal forming device that forms a signal for focusing on the basis of the image signal obtained from the image sensing device, wherein the program repeatedly emits a light for assisting signal forming operation performed by signal forming device at a period of image sensing operation of the image sensing device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DESCRIPTION OF THE PREFERRED EMBODIMENT

A preferred embodiment of the present invention will be described in detail in accordance with the accompanying drawings.

Figure 1:
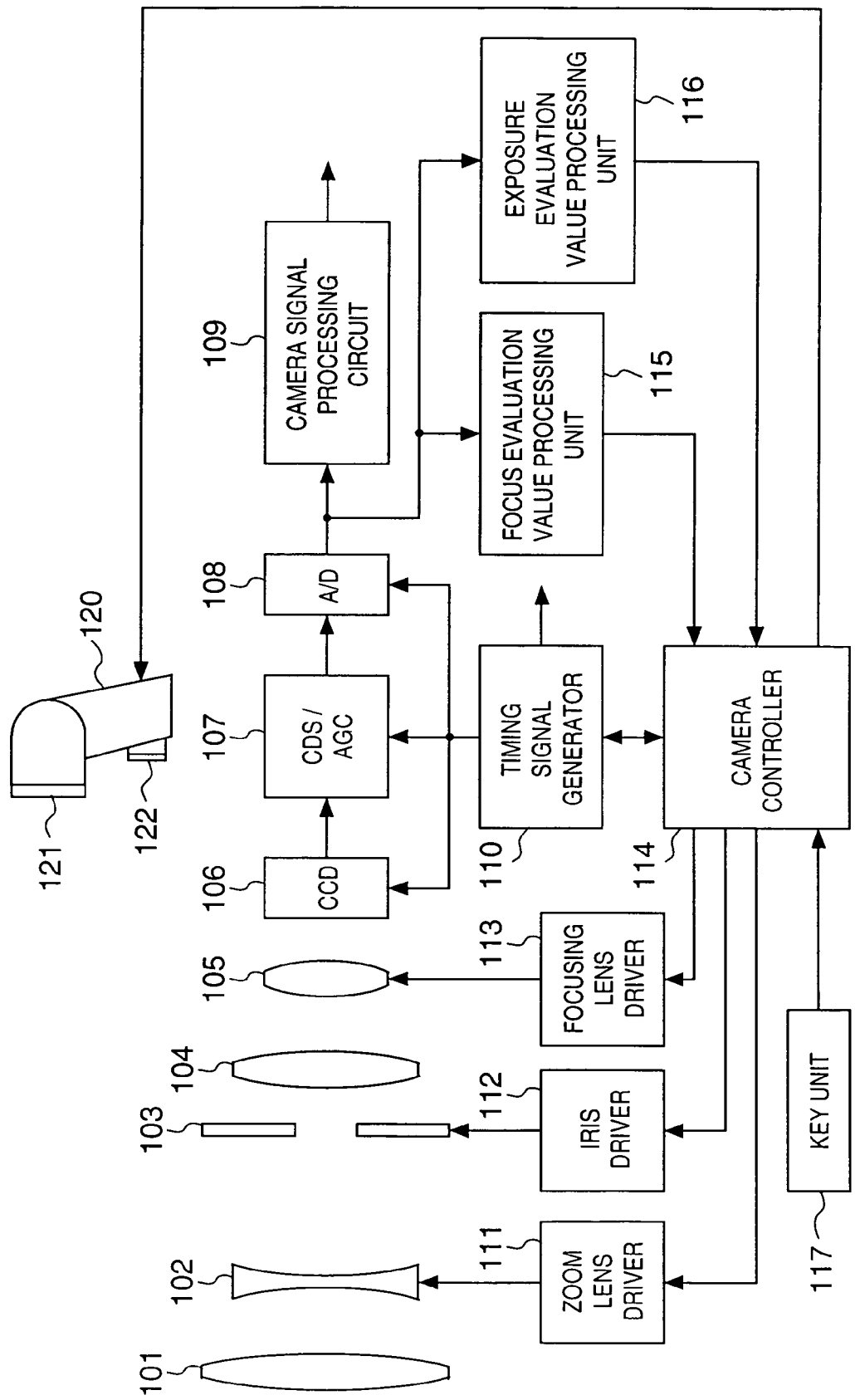
FIG. 1 is a block diagram illustrating the construction of an image sensing apparatus according to an embodiment of the present invention.

FIG. 1 is a block diagram illustrating the construction of a video camera exemplifying an image sensing apparatus according to this embodiment. As shown in FIG. 1, the video camera includes a stationary first lens group 101; a zoom lens 102 for zooming; an iris 103 for adjusting amount of light; a stationary second lens group 104; and a focusing lens 105 having a function for correcting movement of the focal plane that accompanies zooming and a focusing function.

The video camera further includes a CCD 106 as an image sensing device for sensing an optical image of an object and converting the optical image into image signals to be recorded; a CDS/AGC 107 for sampling, holding and amplifying the output of the CCD 106, with the amplification factor thereof being adjusted by a signal from a camera controller (microcomputer) 114, described later; an A/D converter 108 for converting an analog signal from the CDS/AGC 107 to a digital signal; a camera signal processing circuit 109 the output signal of which is recorded on a recording medium such as magnetic tape or memory (i.e., recording of an image is achieved by this operation); and a timing signal generator 110 for supplying various drive pulses and timing pulses to the CCD 106, CDS/AGC 107 and other components of the video camera. In accordance with control data from the camera controller 114, the timing signal generator 110 controls the driving of the CCD 106 in such a manner that the charge accumulation time of the CCD 106 can be controlled at will from drive at an ordinary shutter speed of 1/60 of a second, which is the ordinary NTSC charge accumulation time, to drive at a high shutter speed where the charge accumulation time is a short 1/1000 of a second.

The video camera further includes a zoom lens driver 111 for driving the zoom lens 102; an iris driver 112 for driving the iris 103; and a focusing lens driver 113 for driving the focusing lens 105. Motors contained within the drivers 111, 112 and 113 are driven by signals from the camera controller 114. The latter controls the overall operation of the video camera, controls the focusing lens 105 based upon an output signal from a focus evaluation value processing unit 115, described later, and controls the iris 103 and CDS/AGC 107 based upon an output signal from an exposure evaluation value processing unit 116, described later. The focus evaluation value processing unit 115 extracts high-frequency components, which are used in focus detection, from a luminance signal output from the A/D converter 108. The focus evaluation value output from the focus evaluation value processing unit 115 enters the camera controller 114, which proceeds to drive the focusing lens 105 via the focusing lens driver 113 in such a manner that the focus evaluation value is maximized.

The luminance signal output from the A/D converter 108 is input to the exposure evaluation value processing unit 116. The latter generates an exposure evaluation value, which controls exposure, from an image signal and inputs the exposure evaluation value to the camera controller 114. The latter then controls the diaphragm 103 on the basis of the exposure evaluation value so as to obtain the optimum amount of exposure. A key unit 117, which is connected to the camera controller 114, outputs information indicative of the operation of various keys to the camera controller 114.

A strobe light 120, which is for increasing the illumination of the subject, has a main-light emission unit 121 and a fill-in light emission unit 122.

In the video camera according to this embodiment constructed as illustrated in FIG. 1, the camera controller 114 performs autofocusing by moving the focusing lens 105 in such a manner that the output signal level of the focus evaluation value processing unit 115 is maximized.

The control operation of the camera controller 114 in the video camera according to this embodiment will now be described with reference to the flowchart of FIG. 3. The processing shown in FIG. 3 is executed within the camera controller 114 (by a microcomputer, for example).

Figure 3:
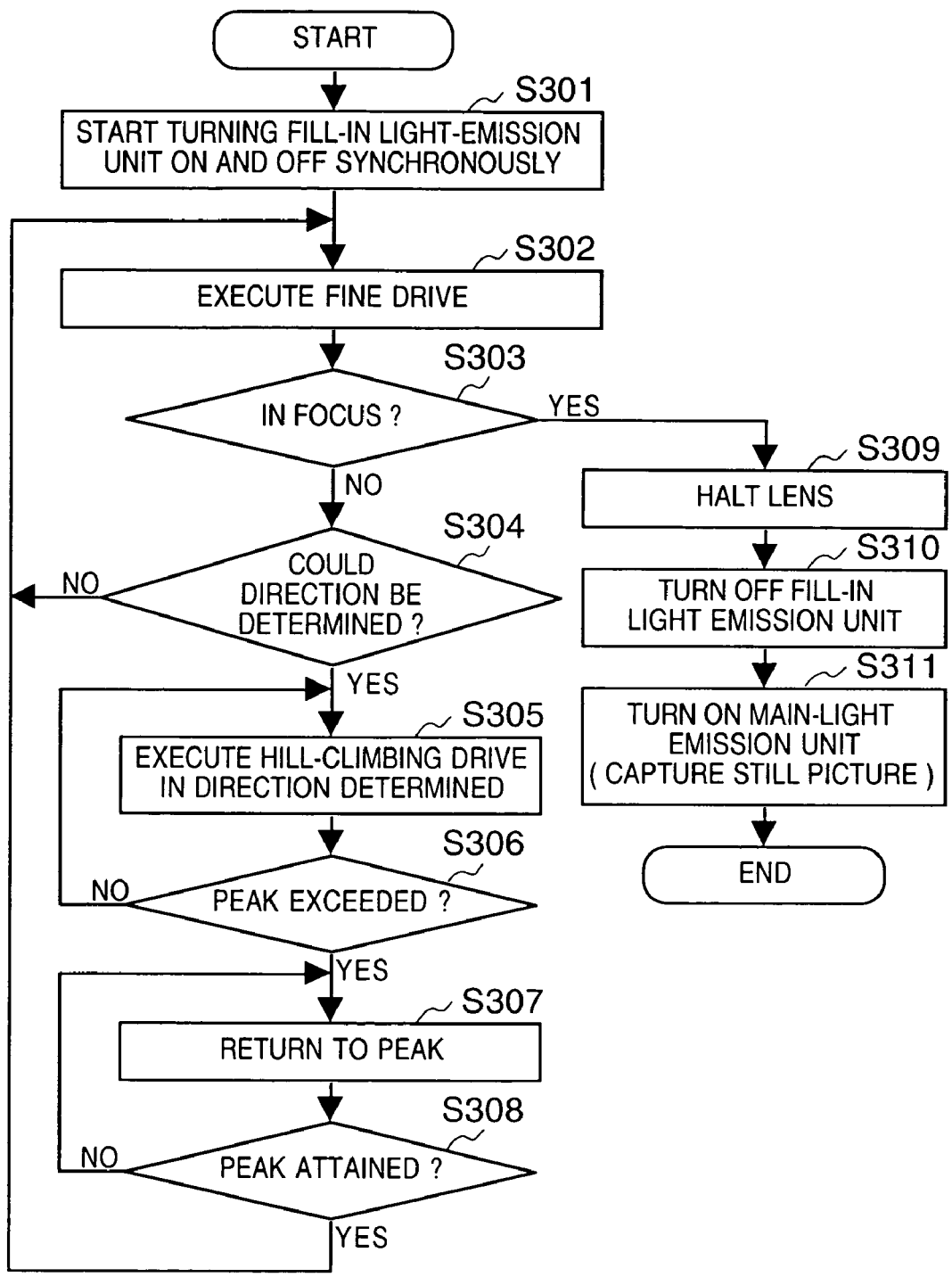
FIG. 3 is a flowchart illustrating the flow of an autofocus control operation in the image sensing apparatus according to this embodiment of the present invention.

Step S301, which is the first step in FIG. 3, calls for the fill-in light emission unit 122 to be synchronized to the vertical scanning intervals so that the light-emission time thereof is controlled in dependence upon the charge accumulation period of the image sensing device 106. (This causes the fill-in light emission unit 122 to be turned on and off synchronously.) The details of the processing at step S301 will be described later with reference to FIG. 4. Next, at step S302, the focusing lens 105 is driven through small increments and the focus evaluation value is read in. Next, on the basis of the focus evaluation value thus obtained at step S302, it is determined at step S303 whether the camera is presently in focus as a result of finely driving the focusing lens.

Figure 2:
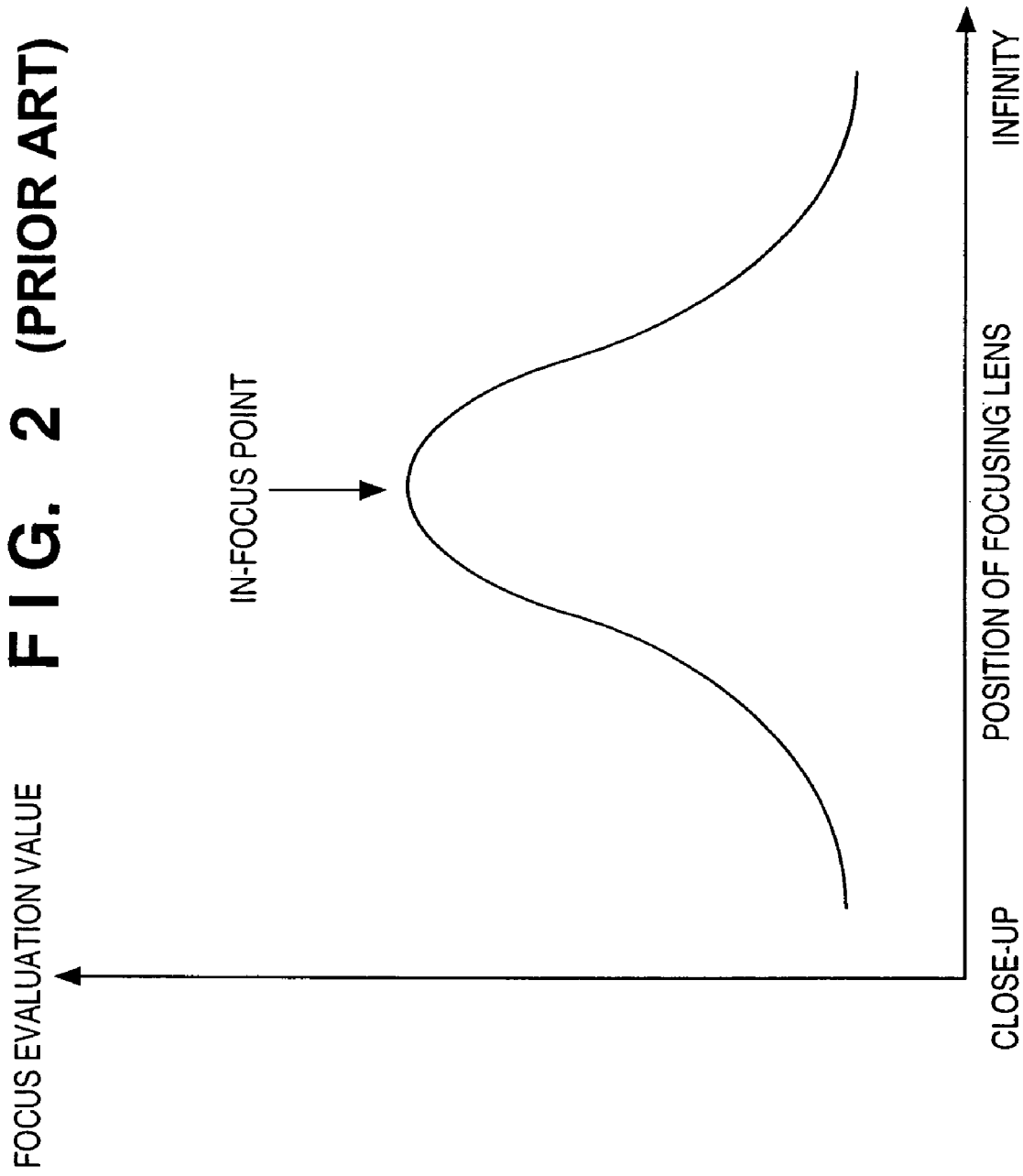
FIG. 2 is a diagram useful in describing a focus evaluation value in the image sensing apparatus according to this embodiment of the present invention.

If it is determined that the camera is not in the focused state, control proceeds to step S304. Here, in accordance with the result of finely driving the focusing lens 105, it is determined in which direction the in-focus point is located (i.e., if the focusing lens 105 should be moved toward the camera side or subject side from its present position to obtain the peak of the focus evaluation value). If the direction in which the in-focus point is located cannot be determined, control returns to step S302. If the direction in which the in-focus point is located can be determined, control proceeds to step S305, at which an operation for moving the focusing lens 105 in the determined direction is executed. (This is referred to as a "hill-climbing operation" owing to the shape of the graph shown in FIG. 2.)

Next, at step S306, it is determined whether the position of the focusing lens 105 has exceeded the in-focus point, i.e., whether it has exceeded the peak of the focus evaluation value. Control returns to step S305 if it is determined that the peak of the focus evaluation value has not been exceeded or proceeds to step S307 if it is determined that the peak of the focus evaluation value has been exceeded. Step S907 calls for the focusing lens to be moved back in the direction of peak of the focus evaluation value. It is then determined at step S308 whether the focus evaluation value has reached the peak. Control returns to step S307 if it is determined that the focus evaluation value has not reached the peak or to step S302 if it is determined that the focus evaluation value has reached the peak.

By executing the processing of steps S307 and S308, the focusing lens 105 can be controlled so as to be moved to the position at which the focus evaluation value is maximized. However, since there are instances where the subject being photographed changes owing to panning or the like during the operation for returning the focusing lens 105 to the position at which the focus evaluation value attains its peak, there are occasions where it cannot be ascertained whether this position is the true peak.

Accordingly, once the focus evaluation value has arrived at the peak, processing returns to that from step S302 onward and the operation for finely driving the focusing lens is performed again in order to confirm that the present focus evaluation value is the true peak, i.e., to confirm that the camera is in the focused state.

If it is determined at step S303 that the camera is in the focused state, control proceeds to a still-picture capture routine from step S309 onward.

Movement of the focusing lens 105 is halted at step S309, the fill-in light emission unit 122 is turned off at step S310 and the main-light emission unit 121 is lit at step S311 to increase the illumination of the subject, in which state the still picture is captured. This processing is then exited.

In the case of the video camera serving as the image sensing apparatus according to this embodiment, the method of lighting the fill-in light emission unit 122 when the fill-in light emission unit 122 is turned on and off at step S301 has the characterizing features set forth below.

Figure 4:
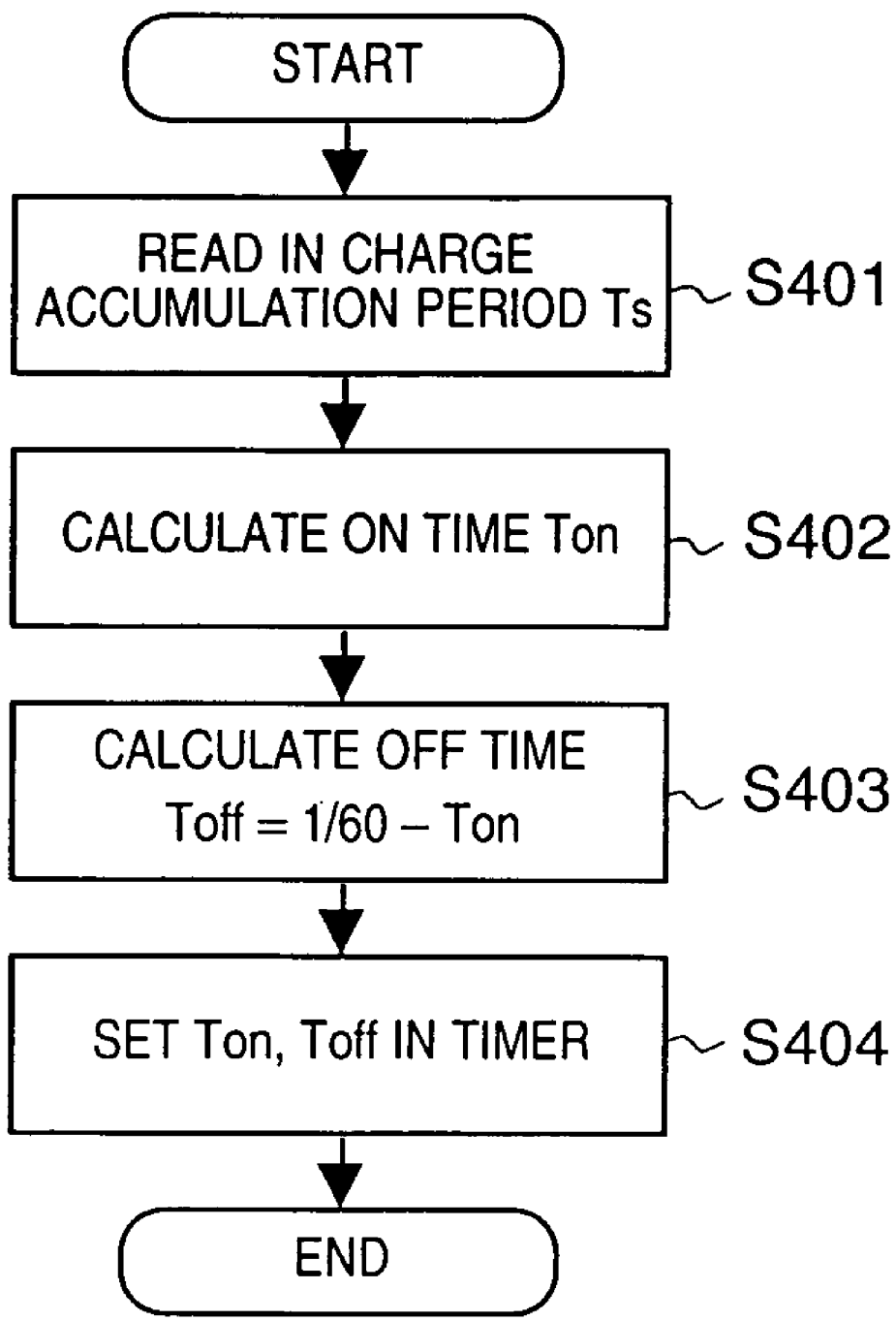
FIG. 4 is a flowchart illustrating the flow of an operation for controlling a fill-in light emission unit in the image sensing apparatus according to this embodiment of the present invention.

FIG. 4 is a flowchart illustrating the flow of processing executed at step S301 in FIG. 3.

At step S401 in FIG. 4, the camera controller 114 reads in the charge accumulation period (shutter speed) Ts at which the image sensing device 106 is being driven via the timing signal generator 110. Next, at step S402, ON time Ton of the fill-in light emission unit 122 is calculated from the charge accumulation period Ts read in at step S401.

Figure 5:
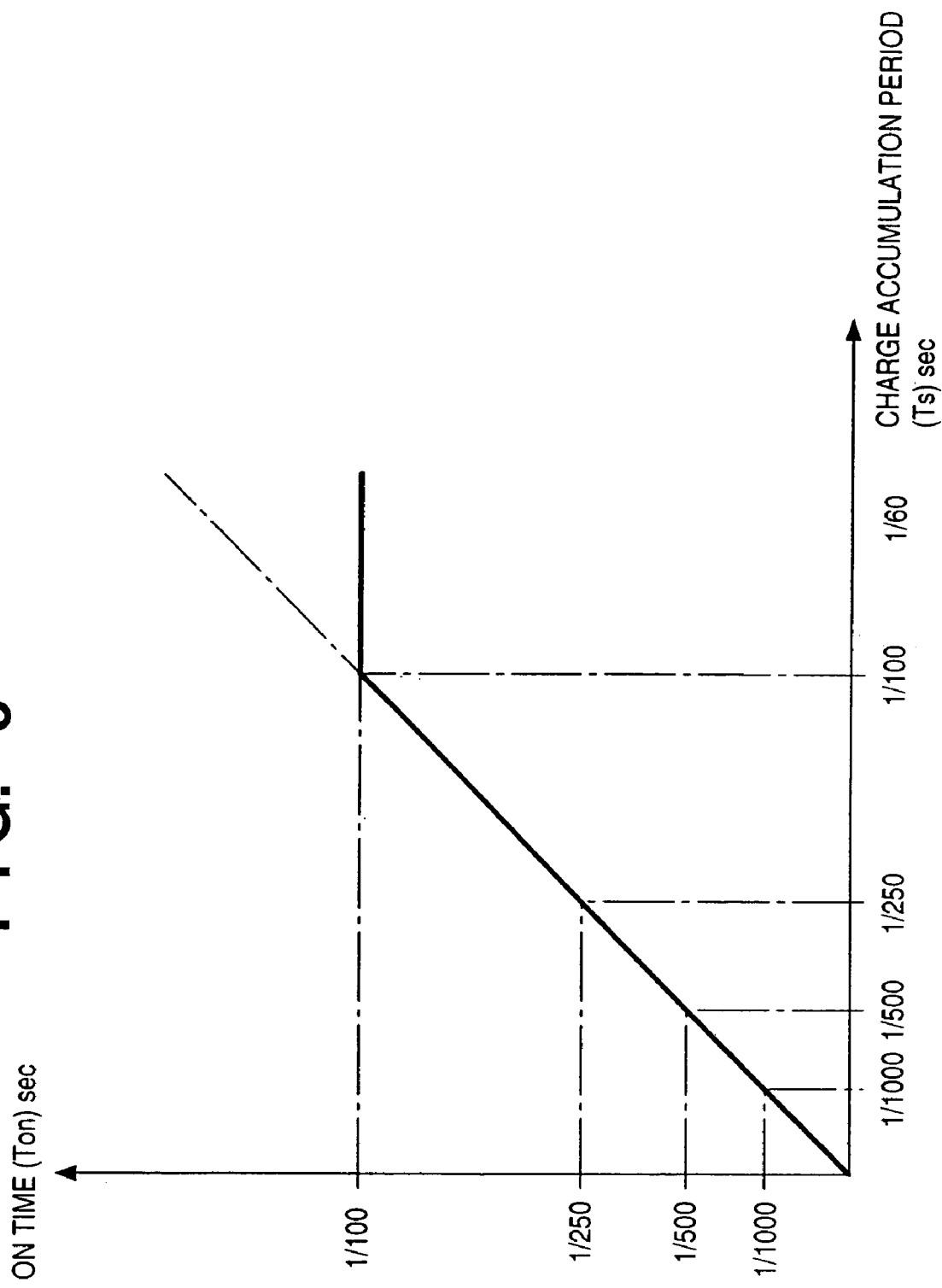
FIG. 5 is a diagram illustrating the relationship between charge accumulation period and ON time of the fill-in light emission unit in the image sensing apparatus according to this embodiment of the present invention.

FIG. 5 is a diagram showing an example of the relationship between the charge accumulation period Ts and ON time Ton of the fill-in light emission unit 122. Here ON time Ton (sec) and charge accumulation period Ts (sec) are plotted along the vertical and horizontal axes, respectively.

As shown in FIG. 5, the charge accumulation period Ts and the ON time Ton of the fill-in light emission unit 122 are proportionally related if the charge accumulation period Ts is less than $1/100$ of a second. Further, the characteristic is such that the ON time Ton is clamped at $1/100$ of a second even if the charge accumulation period Ts is equal to or greater than $1/100$ of a second. This is to prevent the fill-in light emission unit from being lit continuously. By adopting this expedient, OFF time of (Ts-$1/100$) seconds is always provided even if the charge accumulation period Ts exceeds $1/100$ of a second. This makes it possible to improve the durability of the fill-in light emission unit. The ON time Ton of the fill-in light emission unit 122 is found from the charge accumulation period Ts on the basis of this relationship.

Next, at step S403 in FIG. 4, OFF time Toff of the fill-in light emission unit 122 is calculated. In the case of the NTSC system, the charge accumulation period of one field is $1/60$ of a second, and therefore the OFF time Toff of the fill-in light emission unit 122 is equal to ($1/60$-Ton) seconds.

Figure 6:
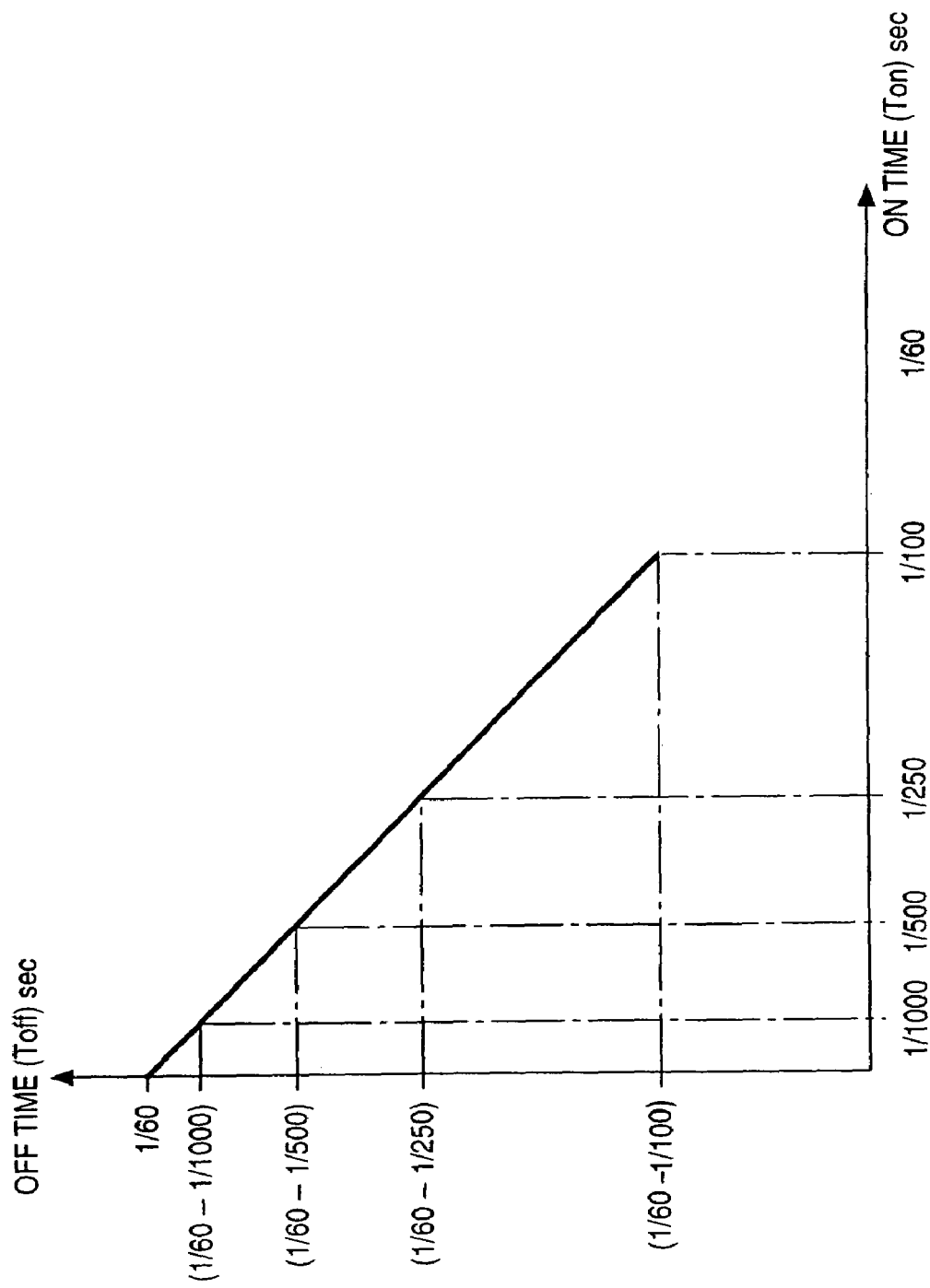
FIG. 6 is a diagram illustrating the relationship between charge accumulation period and OFF time of the fill-in light emission unit in the image sensing apparatus according to this embodiment of the present invention.

FIG. 6 is a diagram illustrating an example of the relationship between the ON time Ton and OFF time Toff of the fill-in light emission unit 122. Here OFF time Toff (sec) and ON time Ton (sec) are plotted along the vertical and horizontal axes, respectively.

Next, at step S404, the data representing the ON time Ton and OFF time Toff of the fill-in light emission unit 122 obtained at steps S402 and S403, respectively, is set in a timer of the microcomputer within the camera controller 114, after which this processing is exited. The microcomputer within the camera controller 114 is synchronized to the vertical scanning interval ($1/60$ of a second in the NTSC system) of the video signal by the value set in the timer, executes interrupt processing in accordance with the timer in this vertical scanning interval and manages the ON time and OFF time of the fill-in light emission unit 122.

Figure 7:
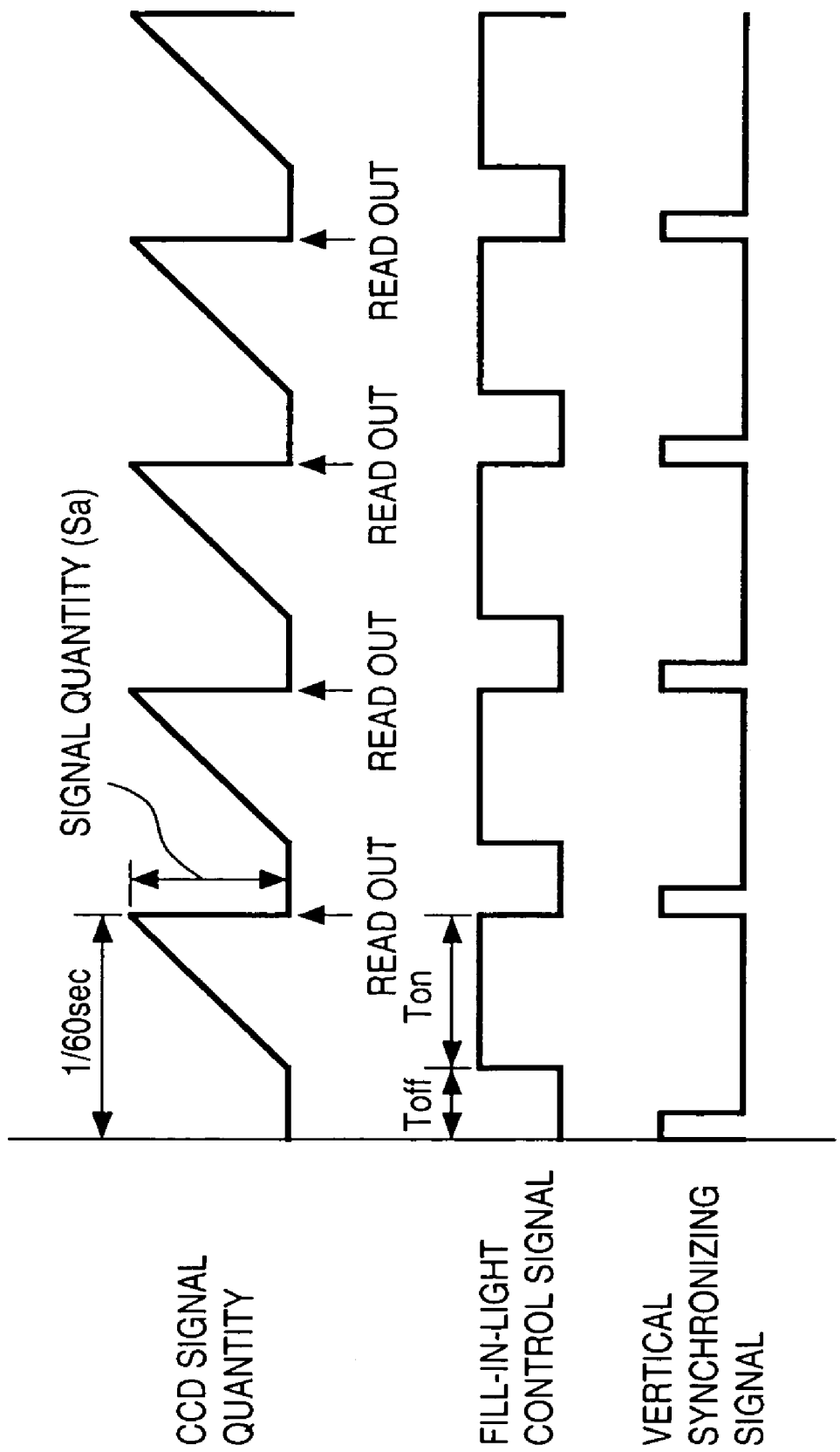
FIG. 7 is a diagram illustrating light-emission timing of the fill-in light emission unit at an ordinary shutter speed (1/60 of a second) in the image sensing apparatus according to this embodiment of the present invention.

FIG. 7 is a diagram illustrating lighting timing of the fill-in light emission unit 122 when the charge accumulation period is $1/60$ of a second. FIG. 7 shows the signal quantity of the CCD 106, the signal for controlling the fill-in light emission unit 122 and the vertical synchronizing signal.

Figure 9:
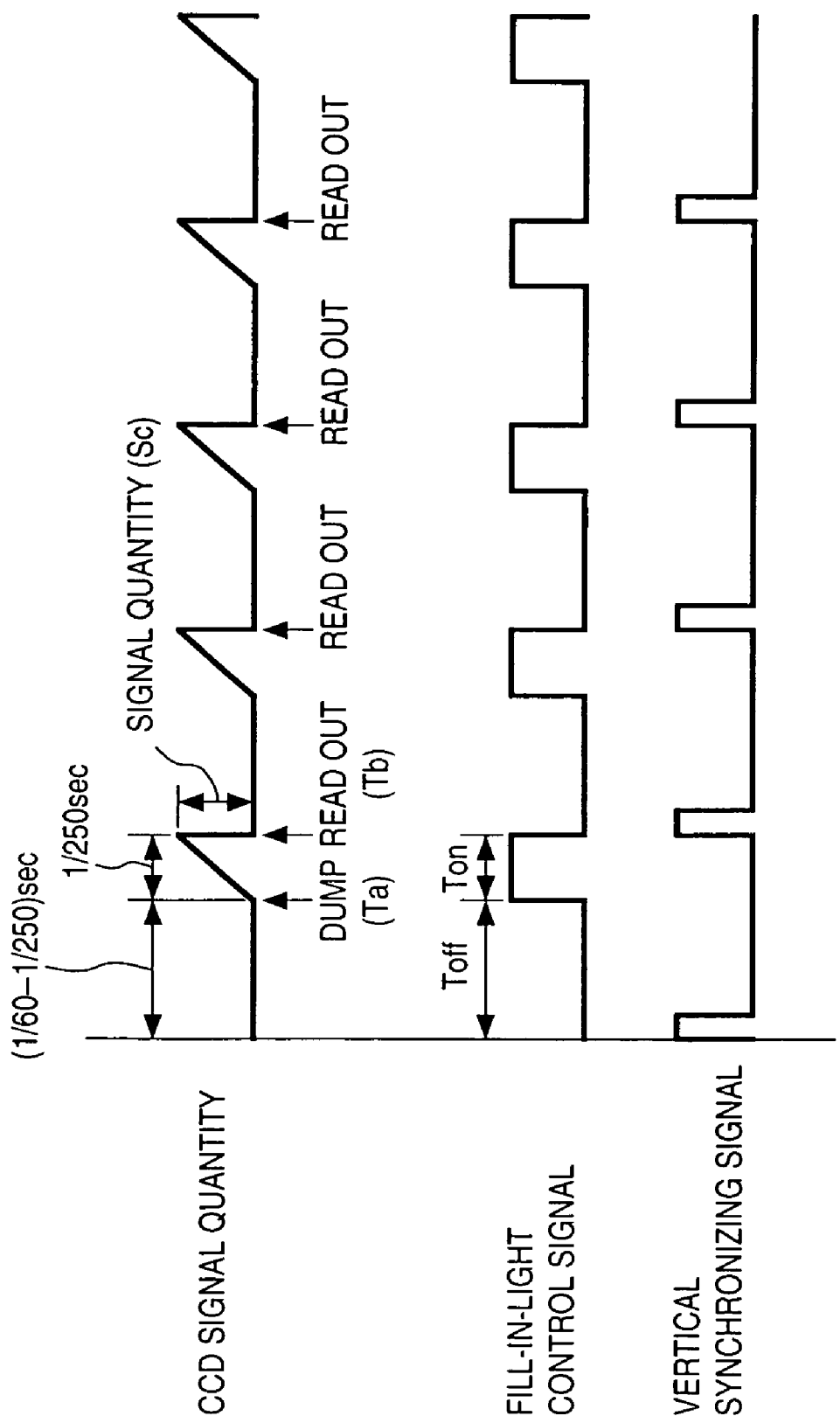
FIG. 9 is a diagram illustrating light-emission timing of the fill-in light emission unit at a high shutter speed (1/250 of a second) in the image sensing apparatus according to this embodiment of the present invention.

FIG. 9 is a diagram illustrating lighting timing of the fill-in light emission unit 122 of this embodiment when the charge accumulation period is ¹⁄₂₅₀ of a second. FIG. 9 shows the signal quantity of the CCD 106, the signal for controlling the fill-in light emission unit 122 and the vertical synchronizing signal.

Figure 8:
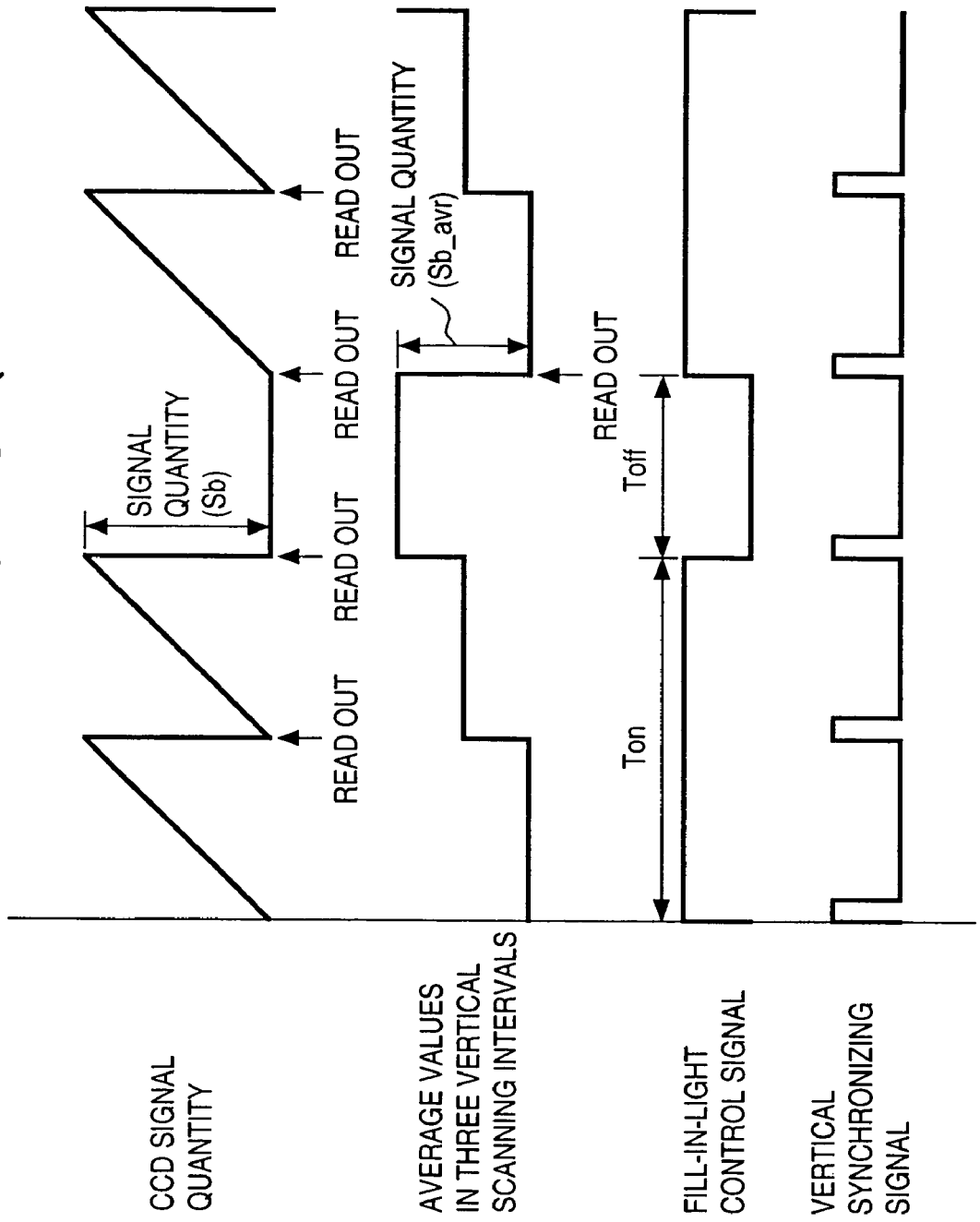
FIG. 8 is a diagram illustrating light-emission timing of a fill-in light emission unit at an ordinary shutter speed (1/60 of a second) in an image sensing apparatus according to the prior art.
Figure 10:
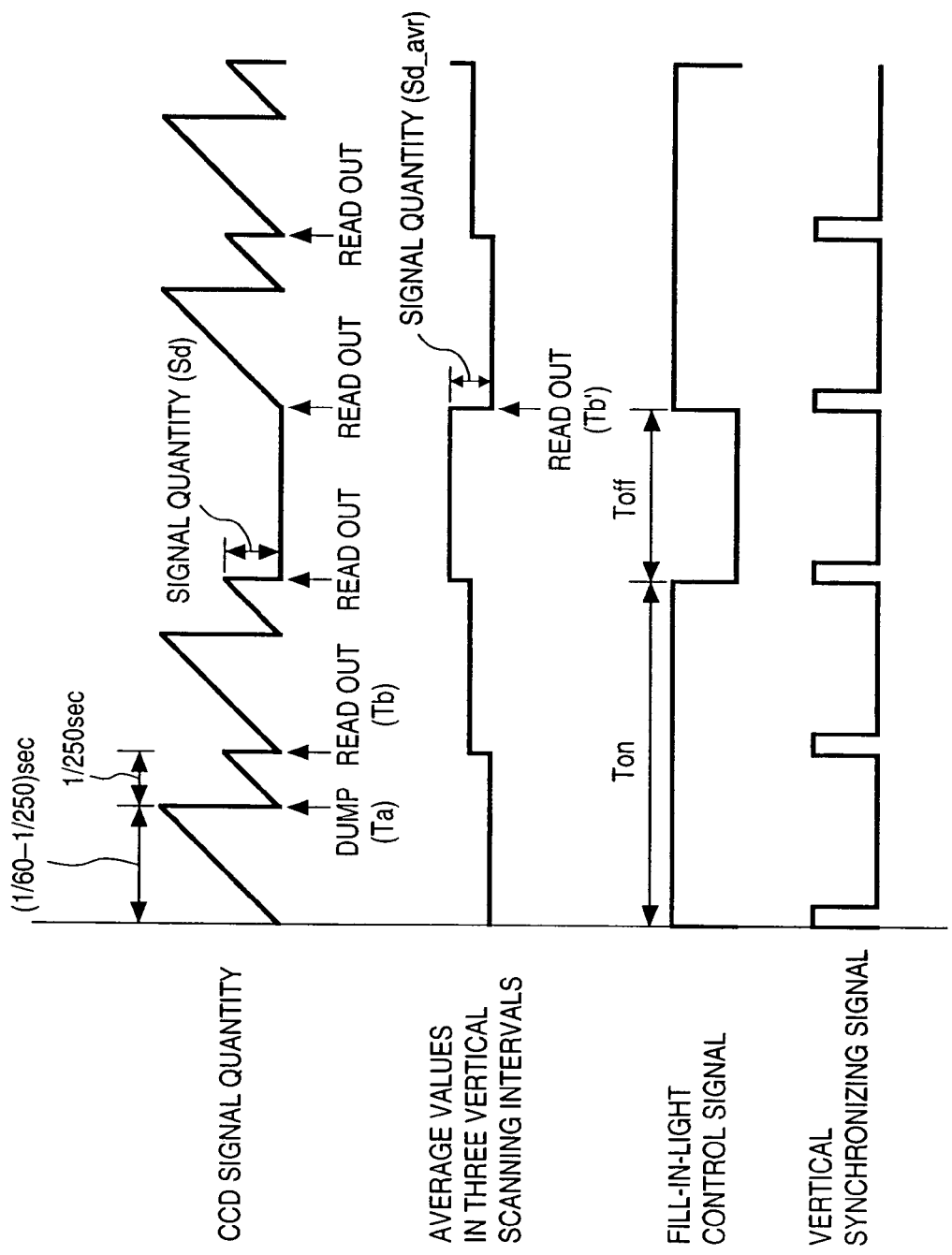
FIG. 10 is a diagram illustrating light-emission timing of the fill-in light emission unit at a high shutter speed (1/250 of a second) in the image sensing apparatus according to the prior art.

For purposes of comparison, lighting timing of the fill-in light emission unit and charge accumulation timing of the image sensing device in the prior art in a case where the charge accumulation time of the image sensing device is ¹⁄₆₀ of a second and in a case where the charge accumulation time is ¹⁄₂₅₀ of a second are illustrated in FIGS. 8 and 10, respectively. FIGS. 8 and 10 show the signal quantity of the image sensing device (CCD), the average values of signal quantities obtained in respective ones of three vertical scanning intervals, the signal for controlling the fill-in light emission unit and the vertical synchronizing signal.

The difference between the present invention and the prior art will be described with reference to FIGS. 7 to 11. It should be noted that FIGS. 7 to 11 illustrate a case where it is assumed that the object photographed is the same and is illuminated by a light source other than fill-in light.

In the conventional method of turning the fill-in light emission unit on and off, a focus evaluation value conforming to the signal quantity Sb is obtained twice in the three vertical scanning intervals, but in one of the vertical scanning intervals, the signal quantity is low, as illustrated in FIG. 8. As a consequence, even if autofocus control is performed in every vertical scanning interval using focus evaluation values obtained on the basis solely of a signal value obtained in each vertical scanning interval, it is inappropriate to use, in autofocus control, a focus evaluation value obtained when the fill-in light emission unit is off if the illumination of the subject is inadequate. This places a limitation upon control and results in a troublesome operation.

By contrast, with the method of turning the fill-in light emission unit on and off according to the present invention, as shown in FIG. 7, a focus evaluation value that corresponds to the signal quantity Sa can be acquired in every vertical scanning interval. As a result, autofocus control can be carried out irrespective of illumination of the subject.

Next, the conventional case where use is made of average values of focus evaluation values in three vertical scanning intervals and the present invention will be compared and described.

Figure 13:
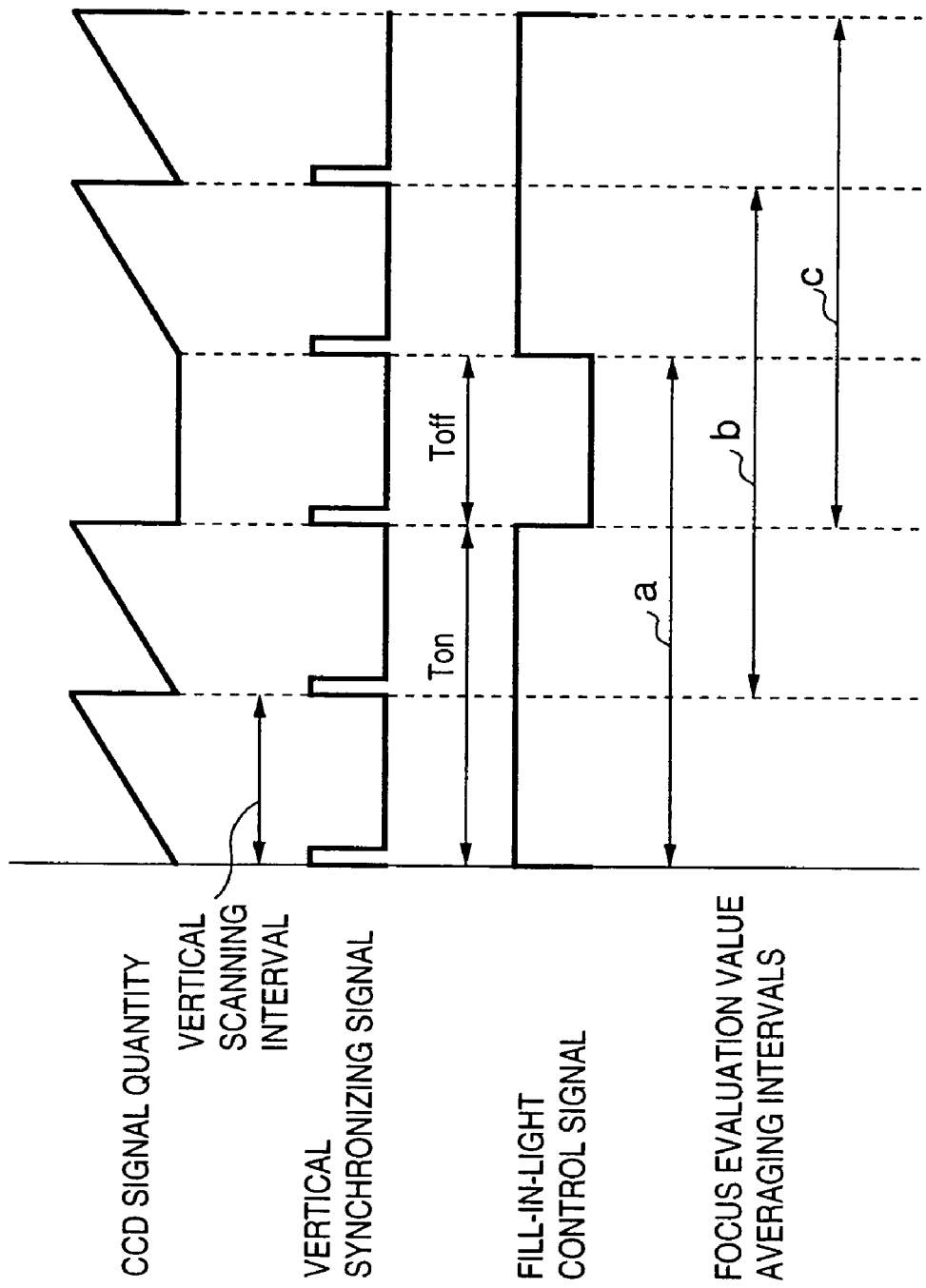
FIG. 13 is a diagram illustrating the lighting scheme of a fill-in light emission unit according to the prior art.
Figure 14:
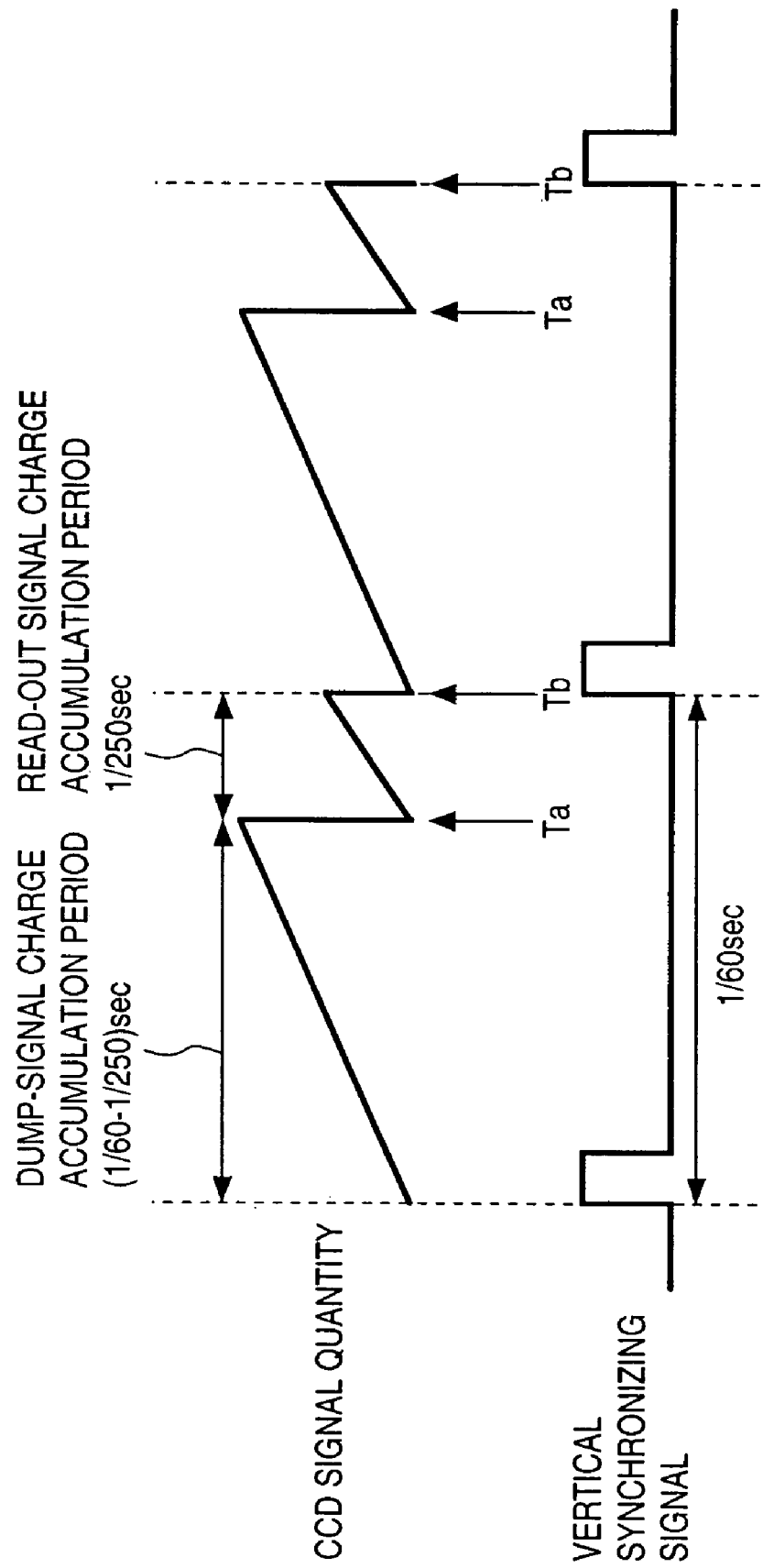
FIG. 14 is a diagram illustrating read-out timing of a CCD at the time of a high shutter speed in the image sensing apparatus according to the prior art.

In the case where the focus evaluation values of, e.g., three successive vertical scanning intervals are added and averaged according to the prior art to artificially obtain a focus evaluation value in each vertical scanning interval, the same focus evaluation values can be obtained in any combination of vertical scanning intervals a, b and c of FIG. 13 even through focus evaluation values are averaged. However, focus evaluation values thus obtained are focus evaluation values of past vertical scanning intervals, i.e., focus evaluation values which contain information that is old in terms of time. It is difficult to perform real-time autofocus control using these focus evaluation values. Moreover, generally the focus evaluation value declines with a decrease in charge accumulation time brought on by an increase in shutter speed. With the conventional method of turning on the fill-in light emission unit, however, a problem which arises is that the focus evaluation value declines by more than the decline in charge accumulation time.

FIG. 8 shows average-value calculation of signals in three vertical scanning intervals according to the prior art. If the ON time Ton according to the present invention is assumed to be the longest ON time and the duty ratio of the ON time Ton to the OFF time Toff is assumed to be the same as that of the prior art (3:1), then the signal quantity Sa shown in FIG. 7 will be a fill-in light emission time that is two-thirds of the vertical scanning interval during which the fill-in light is on in the example of the prior art shown in FIG. 8. The magnitude of the signal quantity Sa, therefore, is related to that of the signal quantity Sb as follows:

$$Sa = Sb \times 2/3 \qquad \text{(Eq. 1)}$$

As indicated by Equation (1), the signal quantity Sb in a vertical scanning interval during which the fill-in light is on in the example of the prior art is an output value that is 1.5 times larger than that of the signal quantity Sa in FIG. 7. However, since the output value in a vertical scanning interval during which the fill-in light is extinguished is low (assumed to be zero in order to simplify the description), the average value Sb_avr of the signal quantity over three vertical scanning intervals is as follows when calculated:

$$Sb\_avr = (Sb \times 2)/3 \qquad \text{(Eq. 2)}$$

Since Sb=Sa×3/2 holds in view of Equation (1), we have $$Sb\_avr = (Sa \times 3/2 \times 2)/3 = Sa \qquad \text{(Eq. 3)}$$

and it will be understood that Sa and Sb_avr are equal in size.

In other words, in the example of the prior art, the image sensing device outputs the signal quantity Sb, which is larger than the signal quantity Sa of the present invention. However, when averaging is performed in the number of vertical scanning intervals in the period during which the fill-in light is on, the value Sb_avr of the focus evaluation values used in autofocus control becomes smaller than the value of the signal quantity Sb.

At ¹⁄₆₀ of a second, the signal value obtained with the present invention and the average value of the signal quantity in the example of the prior art are equal. However, when the shutter speed is raised to thereby shorten the charge accumulation period, the signal value obtained with the prior art is smaller that that obtained with the present invention.

Next, as an example in which the shutter speed is made greater than ¹⁄₆₀ of a second, a further difference between the example of the prior art and the present invention in a case where the charge accumulation period is ¹⁄₂₅₀ of a second will be described with reference to FIGS. 9 and 10.

In control shown in FIG. 10, charge is accumulated at a shutter speed of ¹⁄₂₅₀ of a second. Accordingly, a signal that has accumulated over a period of time from the vertical synchronizing signal to Ta is dumped at the timing of Ta. This means that the emission of fill-in light up to Ta is wasted.

By contrast, with the method of turning on the fill-in light emission unit according to the present invention shown in FIG. 9, the light emission is controlled in sync with the charge accumulation period of the image sensing device. Up to the signal dump timing Ta, therefore, the fill-in light is off, as shown in FIG. 9. This means that the wasteful emission of light that occurs in the prior art can be prevented.

Further, since the signal quantity Sd obtained in a vertical scanning interval during which the fill-in light is on is a signal that has accumulated from Ta to Tb, as shown in FIG.

10, this a value identical with that of the signal quantity Sc shown in FIG. 9. Accordingly, we have $$Sc=Sd \qquad (Eq. 4)$$

If the average value Sd_avr of three vertical scanning intervals shown in FIG. 10 is calculated, the output value in a vertical scanning interval in which the fill-in light is off declines (is assumed to become zero in order to simplify the description). Accordingly, we have the following:

$$Sd\_avr=(Sd\times 2)/3 \qquad (Eq. 5)$$

Since Sd=Sc holds in view of Equation (4), we have $$Sd\_avr=Sc\times 2/3 \qquad (Eq. 6)$$

Thus the average value Sd of signal quantity for the focus evaluation value used in autofocus control becomes two-thirds of the signal quantity Sc obtained with the present invention, as indicated by Equation (6).

Figure 11:
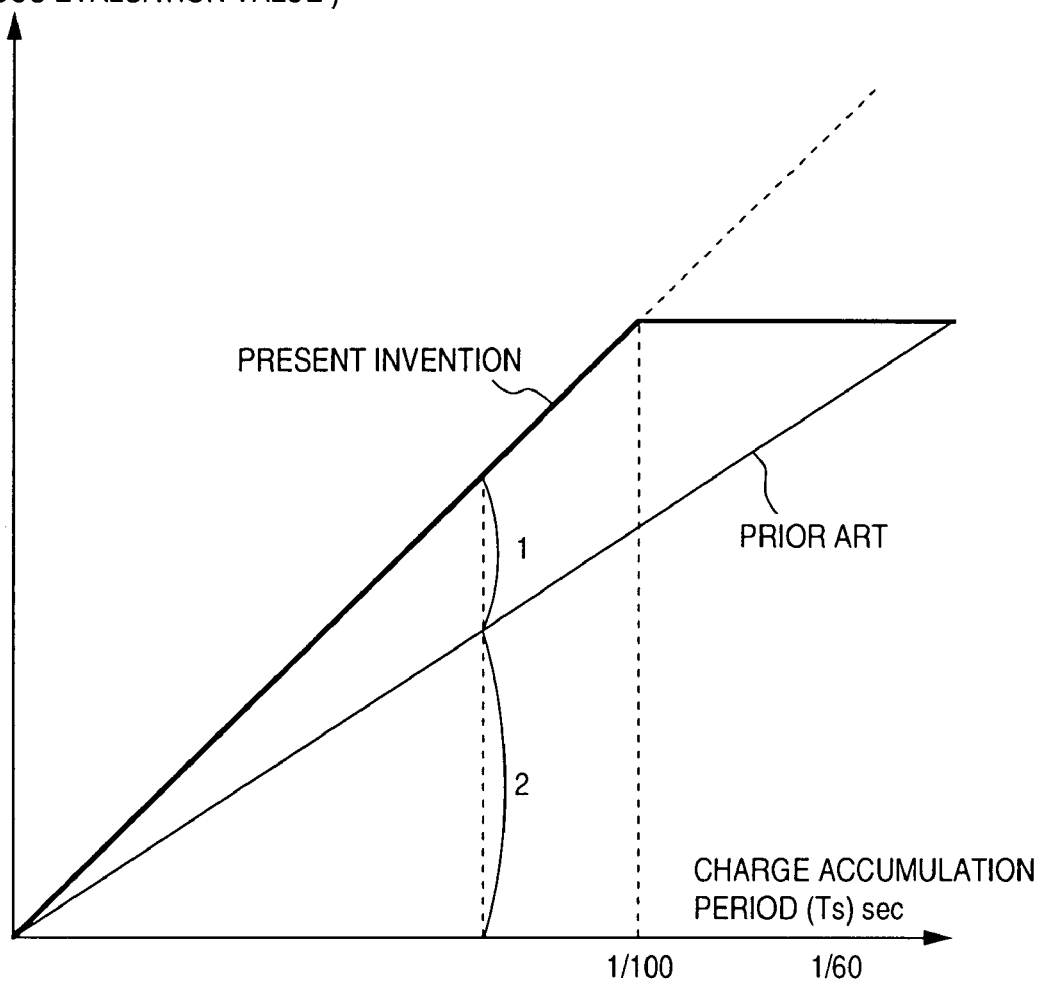
FIG. 11 is a graph illustrating how the relationship between the charge accumulation period and video signal level according to the present invention differs from that according to the prior art.
Figure 12:
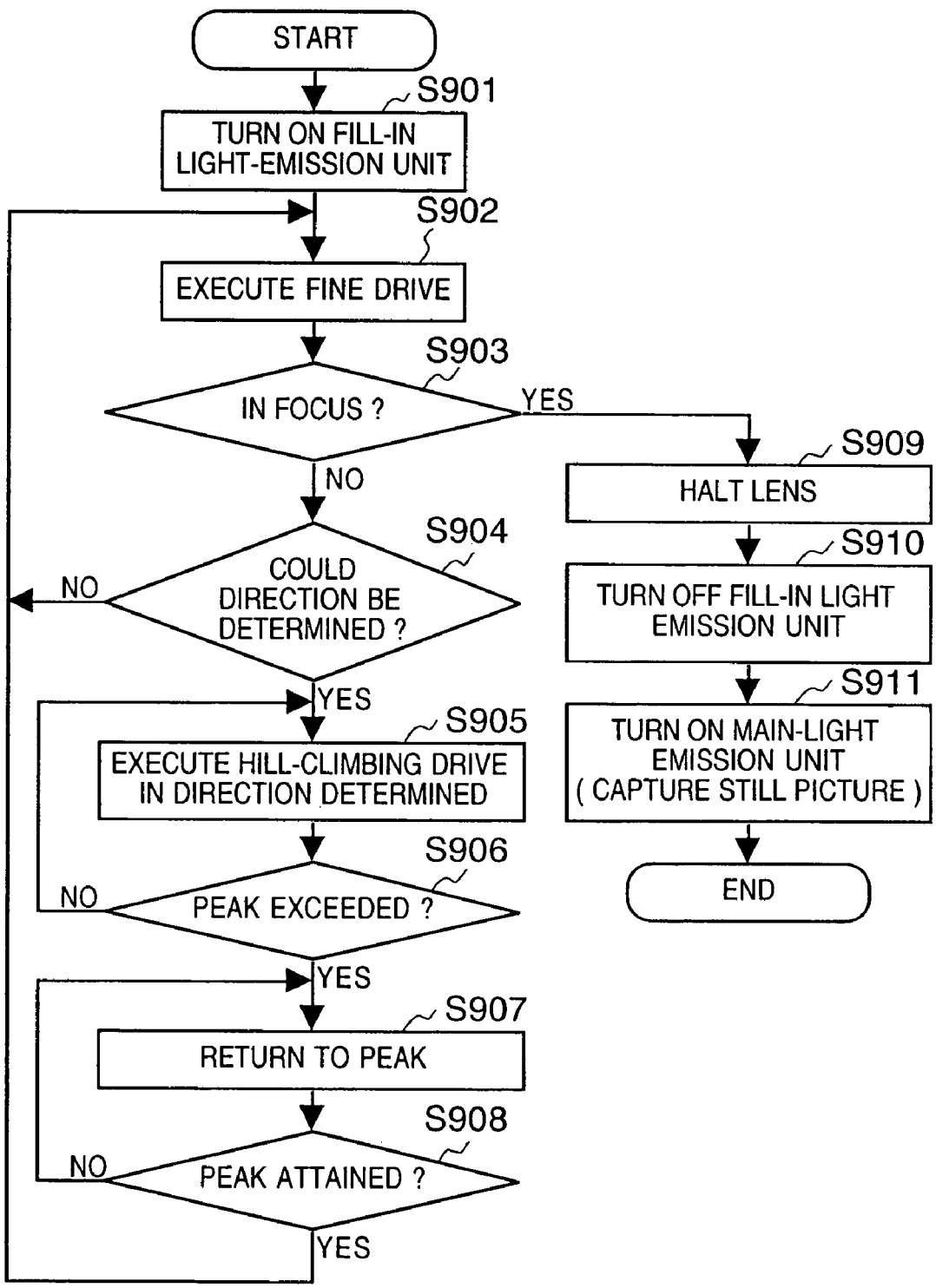
FIG. 12 is a flowchart illustrating the flow of an autofocus control operation in the image sensing apparatus according to the prior art.

FIG. 11 is a graph illustrating the difference between charge accumulation period and video signal level according to the fill-in lighting methods of the present invention and prior art. The bold solid line in FIG. 11 indicates a value representing the signal quantity according to the present invention, and the fine solid line indicates the average value of signal quantity according to the example of the prior art. If, in a case where the duty cycle of fill-in ON time according to the prior art is ⅔, the ratio of charge accumulation period to one vertical scanning interval is greater than 2:3, then the average value of signal quantity obtained with the example of the prior art becomes two-thirds of the signal quantity obtained every vertical scanning interval in accordance with the present invention and the focus evaluation value also becomes two-thirds of that according to the invention, as illustrated in FIG. 11.

Thus, with the method of adding and averaging focus evaluation values in vertical scanning intervals in a period in which the fill-in light is on in the example of the prior art, the focus evaluation value declines by more than the decline in charge accumulation time. In accordance with the present invention, however, as described above, it becomes possible to obtain a focus evaluation value, which is proportional to the charge accumulation period, that is larger than that of the example of the prior art. As a result, the performance of autofocus control can be improved over that of the prior art.

In accordance with this embodiment, as described above, the emission of light from the fill-in light emission unit 122 is synchronized to the vertical scanning interval (1/60 of a second in the NTSC system), and the ON time of the fill-in light emission unit 122 is controlled in dependence upon the charge accumulation period, thereby making it possible to improve the efficiency of light emission by a wide margin. Further, since an effective focus evaluation value can be obtained in every vertical scanning interval, it is possible to carry out autofocus control using all of the focus evaluation values in each of the vertical scanning intervals, unlike fill-in lighting control according to the prior art. In addition, since the emission of fill-in light is performed in sync with intervals in which the video signal is accumulated in dependence upon the shutter speed of the image sensing device, an image signal larger than that of the prior-art system can be obtained even if the charge accumulation period is shortened by raising shutter speed. This improves the performance of autofocus control at the time of high shutter speeds.

Further, the arrangement is such that a fill-in light OFF period greater than a certain predetermined period of time is provided regardless of the charge accumulation period. As a result, the durability of the fill-in light emission unit 122 is enhanced and power consumption is reduced.

OTHER EMBODIMENT

The present invention can be applied to a system constituted by a plurality of devices (e.g., a host computer, interface and camera head, etc.) or to an apparatus comprising a single device (e.g., a video camera).

Furthermore, the object of the invention can also be attained also by supplying a storage medium storing program codes for performing the aforesaid processes to a computer system or apparatus (e.g., a personal computer), reading the program codes by a CPU or MPU of the computer system or apparatus from the storage medium, and then executing the program.

In this case, the program codes read from the storage medium implement the functions of the embodiment and the storage medium storing the program codes constitutes the invention.

Examples of storage media that can be used for supplying the program code are a floppy disk, hard disk, optical disk, magneto-optical disk, CD-ROM, CD-R, magnetic tape, non-volatile type memory card or ROM, etc.

Furthermore, besides the case where the aforesaid functions according to the embodiment are implemented by executing the program codes read by a computer, the present invention covers a case where an operating system or the like running on the computer performs a part of or the entire process in accordance with the designation of program codes and implements the functions according to the above embodiment.

The present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire process in accordance with the designation of program codes and implements the functions of the above embodiment.

In a case where the present invention is applied to the aforesaid storage medium, the storage medium stores program codes corresponding to the flowcharts 3 and 4 and data described in the embodiment.

The above is the explanation of the embodiments of the present invention; however, the present invention is not limited to the embodiments and can be applied to anything as long as functions of the configuration disclosed in the claims or functions of the configuration disclosed in the embodiments are achieved.

For instance, an emission period of a fill-in light is changed in accordance with an accumulation period of the image sensing device in the above embodiments, however, other operation of the fill-in light, such as the intensity of fill-in light, may be changed.

Further, a signal used in focus control is formed by detecting sharpness of an image in the above embodiments, however, the present invention is also applicable to a case where a signal used in focus control is formed in another method.

Furthermore, the hardware configuration and the software configuration of the above embodiments can be properly interchanged each other.

It should be noted that the present invention includes combinations of the aforesaid embodiments or technical elements disclosed therein.

Further, the present invention also includes an apparatus, formed by all or a part of the configuration disclosed in the claims or embodiments of the present invention, which can be used either individually, with another apparatus, or within another apparatus.

Further, the present invention is applicable to: various types of cameras, such as an electronic camera for sensing a moving and/or a still image, a camera using a silver-halide film, a lens-exchangeable camera, a single-lens reflex camera, a leaf shutter camera, and a monitor camera; an image sensing apparatus other than cameras; an optical apparatus; and the like; an apparatus applied to cameras, an image sensing apparatus, an optical apparatus, and the like; control method of the foregoing apparatuses; and a computer program product for providing the control method.

The present invention is not limited to the above embodiments and various changes and modifications can be made within the spirit and scope of the present invention. Therefore, to apprise the public of the scope of the present invention, the following claims are made.

What is claimed is:

1. An image sensing apparatus comprising:
   an image sensing device that senses an optical image of an object and converts the optical image into an image signal to be used for photographing;
   a signal forming device that forms a signal used for focusing on the basis of the image signal obtained from said image sensing device; and
   a control device that emits light once each vertical scanning period for assisting signal forming operation performed by said signal forming device and changes a light-emission time period in each vertical scanning period within and in accordance with a charge accumulation time of said image sensing device when said signal forming device forms the signal for focusing.

2. The image sensing apparatus according to claim 1, wherein the charge accumulation time of said image sensing device is an image sensing period for the image signal to be used for photographing.

3. The image sensing apparatus according to claim 1, wherein said control device emits the light in synchronization with image sensing operation of said image sensing device.

4. The image sensing apparatus according to claim 1, wherein said control device repeatedly emits the light at a period of image sensing operation of said image sensing device.

5. The image sensing apparatus according to claim 4, wherein said period corresponds to a vertical scanning period.

6. The image sensing apparatus according to claim 4, wherein said period corresponds to a period of a vertical synchronizing signal.

7. The image sensing apparatus according to claim 4, wherein said control device does not emit the light for a predetermined period at the period of the image sensing operation of said image sensing device.

8. The image sensing apparatus according to claim 4, wherein said control device does not emit the light at least for a predetermined period at the period of the image sensing operation of said image sensing device.

9. The image sensing apparatus according to claim 1, wherein said control device changes the light-emission time period of the light in accordance with the charge accumulation time of said image sensing device.

10. The image sensing apparatus according to claim 9, wherein said control device increases the light-emission time period of the light as the charge accumulation time of said image sensing device increases.

11. The image sensing apparatus according to claim 9, wherein said control device fixes the light-emission time period of the light to a predetermined period in a case where the charge accumulation time of said image sensing device exceeds a predetermined period.

12. The image sensing apparatus according to claim 1, wherein said control device changes light-emission intensity of the light in accordance with the charge accumulation time of said image sensing device.

13. An image sensing apparatus comprising:
    an image sensing device that senses an optical image of an object and converts the optical image into an image signal to be used for photographing;
    a signal forming device that forms a signal used for focusing on the basis of the image signal obtained from said image sensing device; and
    a control device, for each vertical scanning period, that repeatedly emits light for assisting signal forming operation performed by said signal forming device for a light-emission time period that is within and in accordance with a charge accumulation time of said image sensing device in each vertical scanning period,
    wherein said control device emits the light in synchronization with image sensing operation of said image sensing device.

14. The image sensing apparatus according to claim 13, wherein the charge accumulation time of said image sensing device is an image sensing period for the image signal to be used for photographing.

15. The image sensing apparatus according to claim 13, wherein said control device repeatedly emits the light at a period of image sensing operation of said image sensing device corresponding to a vertical scanning period.

16. The image sensing apparatus according to claim 13, wherein said control device repeatedly emits the light at a period of image sensing operation of said image sensing device corresponding to a period of a vertical synchronizing signal.

17. The image sensing apparatus according to claim 13, wherein said control device does not emit the light for a predetermined period at the period of image sensing operation by said image sensing device.

18. The image sensing apparatus according to claim 13, wherein said control device does not emit the light at least for a predetermined period at the period of image sensing operation of said image sensing device.

19. An image sensing apparatus comprising:
    an image sensing device that senses an optical image of an object and converts the optical image into an image signal to be used for photographing;
    a signal forming device that forms a signal used for focusing on the basis of the image signal obtained from said image sensing device; and
    a control device, for each vertical scanning period, that repeatedly emits light for assisting signal forming operation performed by said signal forming device for a light-emission time period that is within and in accordance with a charge accumulation time of said image sensing device in each vertical scanning period,
    wherein said control device changes emitting the light in correspondence with a charge accumulation time of said image sensing device when said signal forming device forms the signal for focusing.

20. The image sensing apparatus according to claim 19, wherein said control device changes the light-emission time period of the light in accordance with the charge accumulation time of said image sensing device.

21. The image sensing apparatus according to claim 20, wherein said control device increases the light-emission time period of the light as the charge accumulation time period of said image sensing device increases.

22. The image sensing apparatus according to claim 20, wherein said control device fixes the light-emission time period of the light to a predetermined period in a case where the charge accumulation time period of said image sensing device exceeds a predetermined period.

23. The image sensing apparatus according to claim 19, wherein said control device changes light-emission intensity of the light in accordance with the charge accumulation time of said image sensing device.

24. A control method of an image sensing apparatus having: an image sensing device that senses an optical image of an object and converts the optical image into an image signal to be used for photographing; and a signal forming device that forms a signal used for focusing on the basis of the image signal obtained from said image sensing device, said method comprising the steps of:
   emitting light once each vertical scanning period for assisting signal forming operation performed by said signal forming device; and
   changing a light-emission time period in each vertical scanning period within and in accordance with a charge accumulation time of said image sensing device when said signal forming device forms the signal for focusing.

25. A computer-readable medium encoded with a computer control program for control of an image sensing apparatus having: an image sensing device that senses an optical image of an object and converts the optical image into an image signal to be used for photographing; and a signal forming device that forms a signal used for focusing on the basis of the image signal obtained from said image sensing device,
   wherein said program emits a light once each vertical scanning period for assisting signal forming operation performed by said signal forming device and changes a light-emission time period in each vertical scanning period within and in accordance with a charge accumulation time of said image sensing device when said signal forming device forms the signal for focusing.

26. The medium according to claim 25, wherein the medium is a storage medium.

27. An image sensing apparatus capable of sensing an image using a fill-in light emission unit, comprising
   an image sensing unit that obtains an image signal by photoelectric-converting an optical image of an object;
   a determination unit that determines a light-emission time period of said fill-in light;
   a controller that controls said fill-in light emission unit to emit light for the light-emission time period determined by said determination unit in synchronization with start of charge accumulation time; and
   focus control unit that performs focus control on the basis of the image signal obtained from said image sensing unit,
   wherein light is emitted for the light-emission time period once each vertical scanning period.

* * * * *